United States Patent [19]

Samejima et al.

[11] Patent Number: 4,737,067
[45] Date of Patent: Apr. 12, 1988

[54] DEVICE FOR MOUNTING WORKING IMPLEMENTS ON TRACTOR

[75] Inventors: Kazuo Samejima; Akio Hamada; Hironori Tsuchihashi, all of Osaka, Japan

[73] Assignee: Kubota, Ltd., Osaka, Japan

[21] Appl. No.: 786,049

[22] Filed: Oct. 10, 1985

[30] Foreign Application Priority Data

Oct. 19, 1984 [JP] Japan .............................. 59-159009[U]
Jan. 29, 1985 [JP] Japan .............................. 60-11611[U]
Jan. 29, 1985 [JP] Japan .............................. 60-11613[U]

[51] Int. Cl.⁴ .............................................. E02F 3/627
[52] U.S. Cl. ..................................... 414/686; 414/912;
56/DIG. 22; 172/297; 172/502; 172/273; 37/DIG. 3
[58] Field of Search ............... 172/297, 298, 502, 613, 172/685, 817, 272, 273, 274; 37/117.5, 231, 242, DIG. 12, DIG. 15, DIG. 3, 241, 243; 414/686, 912, 920; 56/14.7, 17.1, DIG. 22, 1, 2, 14.9, 15.5, DIG. 9

[56] References Cited

U.S. PATENT DOCUMENTS

| 1,064,282 | 6/1913 | Blake | 37/DIG. 3 X |
| 1,678,113 | 7/1928 | Gustafson | 37/DIG. 3 X |
| 2,269,917 | 1/1942 | Repplinger | 37/DIG. 3 X |
| 2,300,801 | 11/1942 | Parker | 37/DIG. 3 X |
| 2,307,655 | 1/1943 | Arps | 37/DIG. 3 X |
| 2,332,752 | 10/1943 | Ratcliff | 56/DIG. 9 X |
| 2,339,518 | 1/1944 | Reisser | 37/DIG. 3 X |
| 3,324,954 | 6/1967 | Westendorf | 414/686 X |
| 3,422,553 | 1/1969 | Holloway | 172/817 X |
| 4,264,264 | 4/1981 | McMillan et al. | 37/117.5 X |
| 4,321,783 | 3/1982 | Kawasaki et al. | 56/DIG. 22 X |

FOREIGN PATENT DOCUMENTS

| 150832 | 4/1953 | Australia | 172/817 |
| 33-1087 | 1/1958 | Japan. | |
| 33-25010 | 5/1958 | Japan. | |

Primary Examiner—Joseph J. Rolla
Assistant Examiner—Edward S. Ammeen
Attorney, Agent, or Firm—Birch, Stewart, Kolasch & Birch

[57] ABSTRACT

A pair of mount members extending longitudinally of the body of a tractor are fixedly provided at opposite sides of the tractor body. A pair of projecting brackets positioned toward the front from the steps of the tractor extend laterally outward from front portions of the pair of mount members and are provided with a pair of opposite mount portions for a front loader and with a pair of opposite front mount portions for a working implement of the mid-mount type. A pair of opposite rear mount portions for the implement are provided at opposite sides of longitudinally intermediate portions of the mount members or of a longitudinally intermediate portion of the tractor body.

10 Claims, 12 Drawing Sheets

DEVICE FOR MOUNTING WORKING IMPLEMENTS ON TRACTOR

FIELD OF THE INVENTION AND RELATED ART STATEMENT

The present invention relates to a device for mounting working implements on a tractor, and more particularly to a device for mounting one or both of a front loader and a working implement of the mid-mount type on the body of a tractor.

Examined Japanese Utility Model Publication SHO No. 58-25010 discloses a device for mounting a front loader on a tractor body.

With the above device, longitudinally intermediate opposite side portions of the tractor body have a pair of fixed mount members for the front loader, and a socket member is fixed to the upper end of each mount member. Attaching members at the base end of the front loader are fitted in the socket members and removably fixed thereto by fasteners.

Examined Japanese Utility Model Publication SHO No. 58-1087 discloses a device for attaching a working implement of the mid-mount type, such as a mower or cultivator, to tractors.

This device comprises a mower mount member, U-shaped in section, for covering the bottom and opposite sides of the tractor body, extends longitudinally of the tractor body and is fixed to the body by bolts. A mower of the midmount type is attached to the mount member.

However, it is impossible to attach the front loader mount members and the mower mount member to the tractor body at the same time because they interfere with each other.

According to the prior art, therefore, only one of the front loader mount device and the mower mount device can be attached to the tractor body, so that only one of the front loader and the mower can be mounted on the tractor body at one time.

OBJECTS AND SUMMARY OF THE INVENTION

A first object of the present invention is to make it possible to mount one or both of a front loader and a mid-mount type working implement on the tractor body.

A second object of the present invention is to make it possible for the tractor body and the whole assembly of a pair of mount members at opposite sides of the body to satisfactorily support the gravity acting on the front loader and mid-mount type working implement and the load acting thereon.

A third object of the present invention is to provide a mount device which is so designed as described above and which comprises projecting brackets for mounting the front loader and the mid-mount type working implement on the tractor body, the brackets being so positioned as not to become an obstacle to the driver when he rides in or gets off the tractor and, when desired, being serviceable as an auxiliary step for the driver to ride in or get off the tractor.

To fulfill the above objects, the present invention provides a device of the following construction.

A pair of mount members are provided at opposite sides of a tractor body and extends longitudinally of the tractor body. Each of the mount members is attached at its front end to a front portion of the tractor body and at its rear end to a rear portion of the body.

A pair of projecting brackets positioned toward the front from the steps of the tractor extend laterally outward from front portions of the pair of mount members and are provided with a pair of opposite mount portions for a front loader and with a pair of opposite front mount portions for a working implement of the mid-mount type.

A pair of opposite rear mount portions for the mid-mount type working implement are provided at opposite sides of longitudinally intermediate portions of the mount members or of a longitudinally intermediate portion of the tractor body.

BRIEF DESCRIPTION OF THE DRAWINGS

FIGS. 1 to 7 show a first embodiment of the present invention;

FIGS. 8 to 11 show a second embodiment of the present invention;

FIGS. 12 and 13 show a third embodiment of the invention;

FIGS. 14 to 18 show a fourth embodiment of the invention;

FIGS. 19 to 21 show a fifth embodiment of the invention;

DESCRIPTION OF THE PREFERRED EMBODIMENTS

Embodiments of the present invention will be described below with reference to the drawings.

Figure 1:
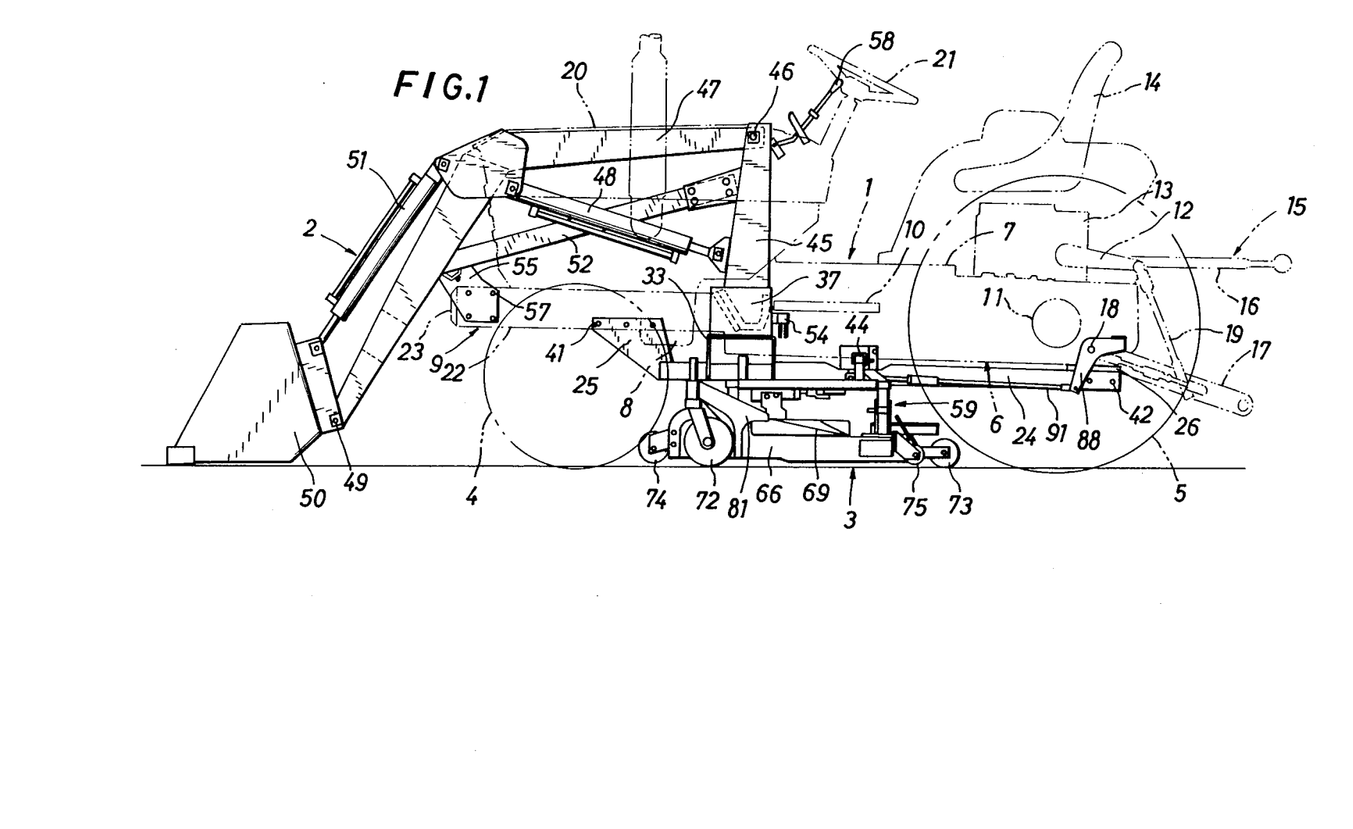
FIG. 1 is an overall side elevation.
Figure 2:
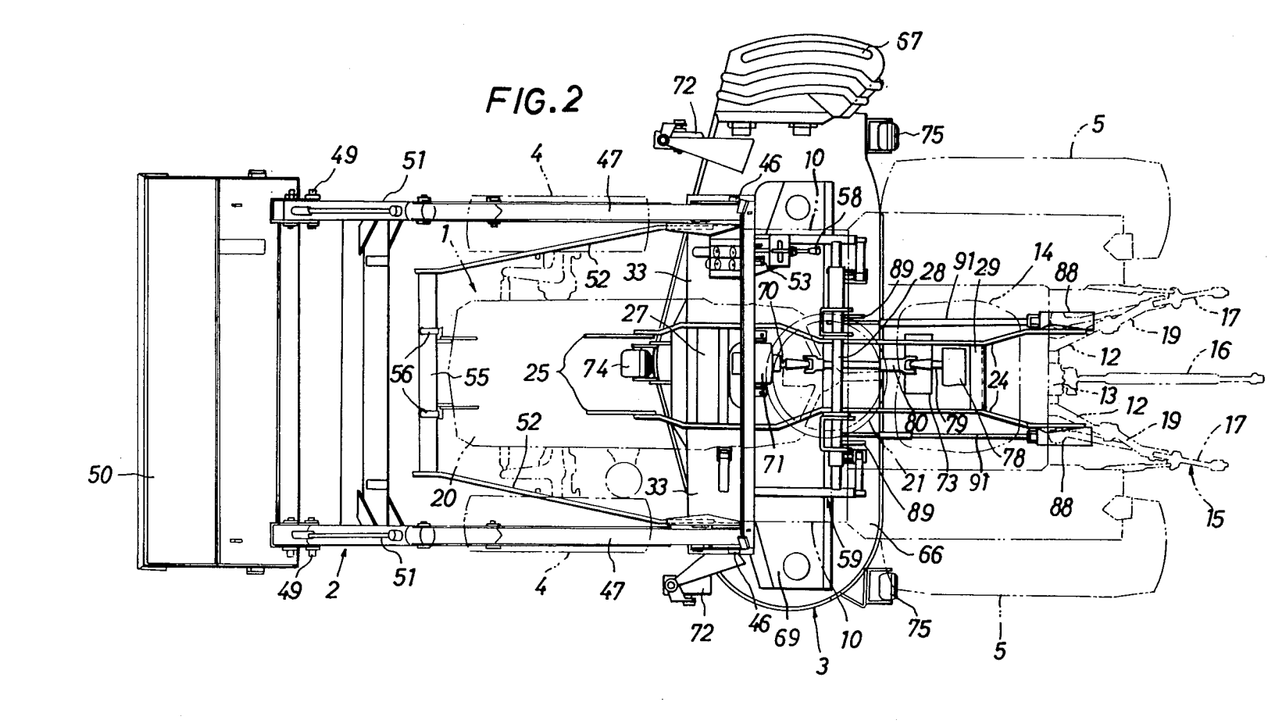
FIG. 2 is a plan view of the same.
Figures 3, 10:
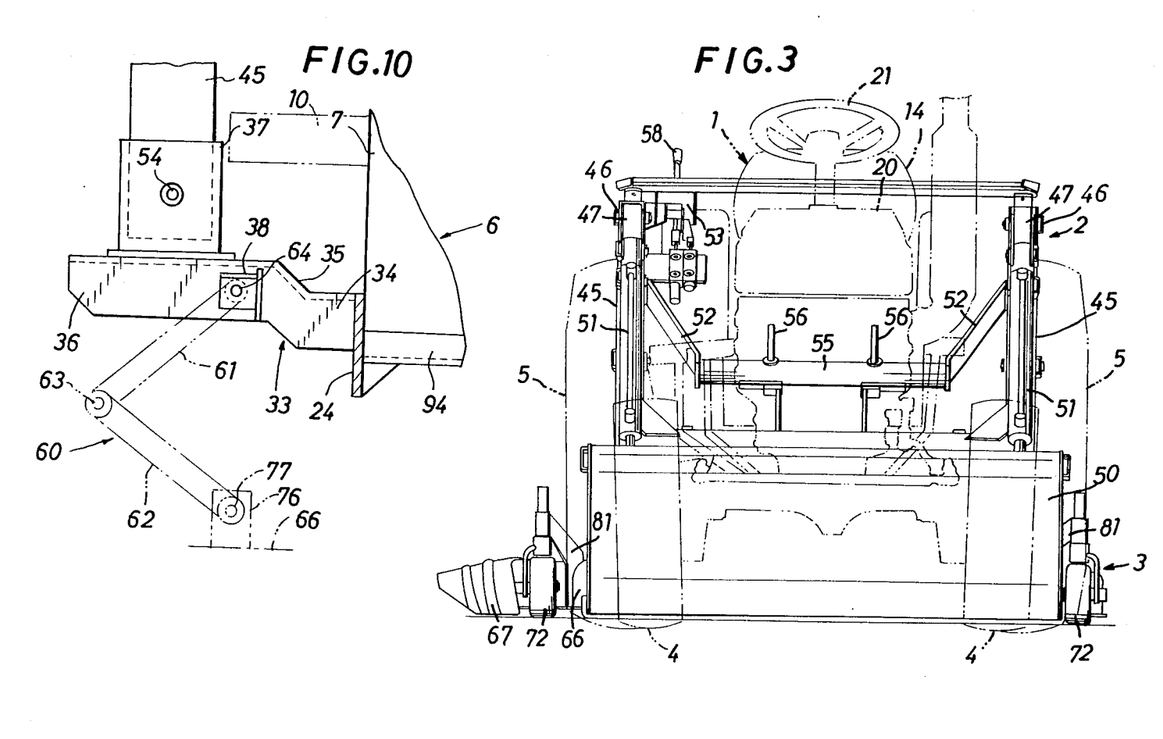
FIG. 3 is a front view of the same.
FIGS. 10 and 11 are views in section taken along the line A—A and the line B—B in FIG. 9, respectively.
Figure 4:
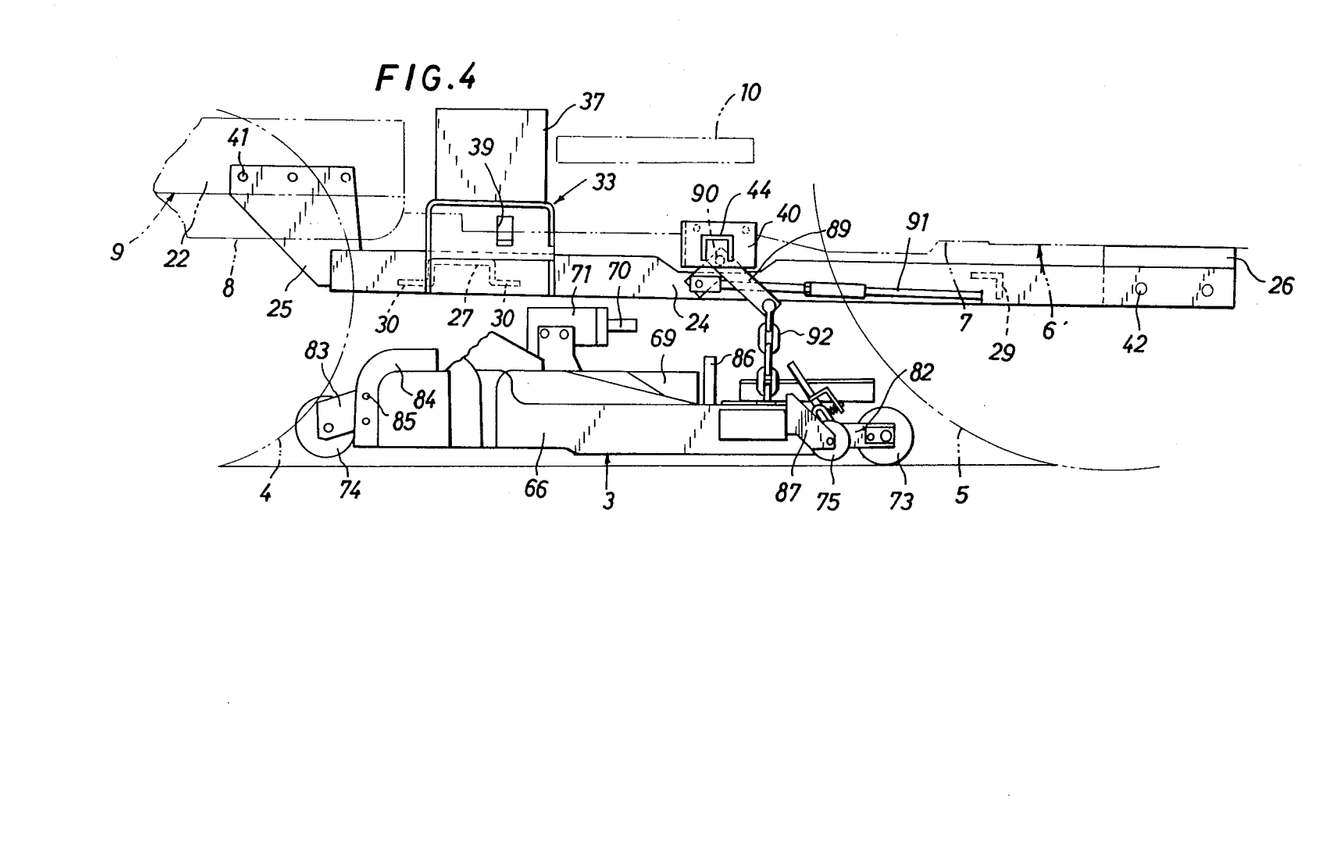
FIG. 4 is a fragmentary side elevation of the same.

FIGS. 1 to 7 show a first embodiment of the present invention. With reference to FIGS. 1 to 3, a tractor 1 has removably mounted thereon a front loader 2 and a mower 3 which is an example of working implement of the mid-mount type.

The tractor 1 is of the two-axle four-wheel type and has a pair of front wheels 4 and a pair of rear wheels 5. The body 6 of the tractor 1 comprises a transmission case 7, an engine 8, a front axle frame 9, etc. as arranged from rear to front in this order.

Projecting laterally outward from opposite sides of a front portion of the transmission case 7 are a pair of steps 10 for the driver to ride on or get off the tractor.

A pair of rear axle cases 11 extend laterally outward from opposite sides of a rear portion of the transmission case 7. A hydraulic unit 13 for lifting a working implement is mounted on the rear portion of the case 7. The unit 13 has a pair of opposed lift arms 12 and is provided with a driver's seat 14 thereon.

The transmission case 7 has at its rear end a three-point link assembly 15 for connecting the working implement to the tractor 1. The assembly 15 comprises a central top link 16 and a pair of opposed lower links 17.

The top link 16 is pivoted, for example, to the rear end of the case 7 removably, while the lower links 17 are removably pivoted by pins 18 to the rear portion opposite sides of the case 7. The lower links 17 are connected to the lift arms 12 by lift rods 19.

The engine 8 is covered with a bonnet 20, and a steering wheel 21 is provided at the rear end of the bonnet 20.

The front axle frame 9 comprises a pair of side plates 22 extending forward from lower opposite side portions of the engine 8, and a connecting plate 23 interconnecting the front ends of the side plates 22.

As shown also in FIGS. 4 to 7, a pair of plate-like mount members 24 are provided at opposite sides of the tractor body 6 and extend longitudinally of the body 6. Each mount member 24 is removably attached at its front end to the side plate 22 of the frame 9 by a connecting plate 25 and bolts 41 and at its rear end to a bracket 26 by bolts 42, the bracket 26 being attached to the rear end of the case 7.

The front end of the mount member 24 may alternatively be attached directly to the engine 8, while the rear end of the member 24 may be attached to the rear axle case 11.

When required, a longitudinally intermediate portion of each mount member 24 is also removably attached to the case 7.

The two mount members 24 are interconnected into a rigid body by front, intermediate and rear connecting members 27, 28, 29 at their front ends, longitudinally intermediate portions and rear ends. These connecting members 27 to 29 are arranged under the transmission case 7.

A channel member having lips 30 is used as the front connecting member 27, a round rod as the intermediate connecting member 28, and an angle member as the rear connecting member 29.

The intermediate connecting member 28 is secured to the inner surfaces of bracket plates 31, which are fixed to the outer surfaces of the mount members 24 individually. The mount member 24 is fixedly provided with a reinforcement plate 32 where it has the bracket plate 31 secured to its inner surface.

A pair of projecting brackets 33 extend laterally outward from front portions of the mount members 24. Each of the brackets 33 is in the form of a channel which is open downward and comprises a horizontal inner portion 34, an intermediate slanting portion 35 extending upwardly outward from the inner portion 34 and a horizontal outer portion 36.

A front loader mount portion 37 in the form of a box having an open upper end is provided on the horizontal outer portion 36.

A mower front mount portion or fore mount 38, which is an example of mid-mount type working implement front mount portion, is provided on the horizontal inner portion 34. The mount portion 38 is in the form of a U-shaped frame. An opening 39, elongated laterally or transversely of the tractor body, is formed in the top wall of the bracket 33 providing the inner and slanting portions 34, 35 thereof.

A bracket frame 40 is removably attached to each bracket plate 31 by bolts 43. A mower rear mount portion or hind mount 44, which is an example of mid-mount type working implement rear mount portion, is secured in an outwardly projecting form to the outer surface of the bracket frame 40. The mount portion 44 is in the form of a U-shaped frame. The bracket frame 40 is removably attached to the transmission case 7 or may be otherwise provided.

The front loader 2 comprises a pair of opposite attaching members 45, a pair of lift arms 47 pivoted at their base ends to the attaching members 45 by pins 46, a pair of lift cylinders 48 for moving the lift arms 47 upward or downward, a bucket 50 pivoted to the forward ends of the lift arms 47 by pins 49, a pair of bucket cylinders 51 for turning the bucket 50, a pair of braces 52 extending forward from the attaching members 45, a control unit 53 mounted on the attaching member 45 on the right side, etc.

The attaching members 45 have tapered ends which are removably fitted in the mount portions 37 from above and fixed thereto by fastening members 54 releasably.

The front ends of the braces 52 are placed on a pair of supports 55 and releasably fixed thereto by fasteners 56. The supports 55 are removably attached to the side plates 22 of the front axle frame 9 by bolts 57.

Hydraulic cylinders are used as lift cylinders 48 and bucket cylinders 51 and are controlled by a control lever 58 of the control unit 53.

The mid-mount mower 3 is liftably and removably mounted on the tractor by means of a lift link mechanism 59 and the front and rear mount portions 38, 44. It is positioned under the transmission case 7 between the front and rear wheels 4, 5.

The lift link mechanism 59 comprises a pair of opposed flexible link assemblies 60 each comprising each pair of upper link 61 and lower link 62 in front and rear, and a connecting rod 63.

The upper ends of the front and rear lower links 62 are fixed to the connecting rod 63, while the lower ends of the front and rear upper links 61 are rotatably fitted around the rod 63. The upper ends of the upper links 61 are positioned within the mower front and rear mount portions 38, 44 and removably pivoted thereto by pins 64, 65 extending longitudinally of the tractor.

The front upper link 61 is removably inserted through the opening 39 in the projecting bracket 33.

The mower 3 comprises a mower deck 66 which is open at the bottom and right side end, a discharge cover 67 pivoted to the right side end of the mower deck 66 for guiding cut grass rightward, three rotary cutters 68 arranged under the mower deck 66 approximately transversely of the tractor, a belt transmission mechanism disposed above the rear portion of the deck 66 for operatively connecting the cutters 68 together, a cover 69 fixed to the rear portion of the mower deck 66, an input case 71 fixedly mounted on the cover 69 and having a rearwardly projecting input shaft 70, a pair of front cutting height adjusting gauge wheels 72 at the opposite sides of the mower, a rear cutting height adjusting gauge wheel 73 at the center, a front limit gauge wheel 74 at the center, and a pair of rear limit gauge wheels 75 at the opposite sides.

The mower deck 66 is provided at each of its opposite sides with a pair of front and rear U-shaped upright brackets 76, and the lower ends of the front and rear lower links 62 of the flexible link assembly 60 are disposed in the brackets 76 and removably pivoted thereto by pins 77 extending longitudinally of the tractor.

The tractor 1 has a power take-off unit 78 having a power take-off shaft 79, which is separably connected to the input shaft 70 by a universal joint shaft 80. The power take-off unit 78 is provided on the bottom side of rear portion of the transmission case 7.

The gauge wheels 72, 73 are adapted for adjusting the grass cutting height for the rotary cutters 68. The front gauge wheels 72 are attached to the opposite sides of front portion of the mower deck 66 by brackets 81, while the rear gauge wheel 73 is attached to the laterally middle rear portion of the deck 66 by a bracket 82. These gauge wheels 72, 73 are upwardly or downwardly movable for adjustment.

The limit gauge wheels 74 and 75 serve to prevent the mower deck 66 from contact with the ground. The central front limit gauge wheel 74 is attached to the laterally middle front portion of the deck 66 by a pair of bracket plates 83 and a pair of deck reinforcing members 84.

The deck reinforcing members 84 serve also as front stoppers, have a large thickness and high strength, are in the form of an L-shaped plate when seen from one side and are secured to the front portion of the top wall of the deck 66 and to the front wall thereof.

Figures 5, 13, 18:
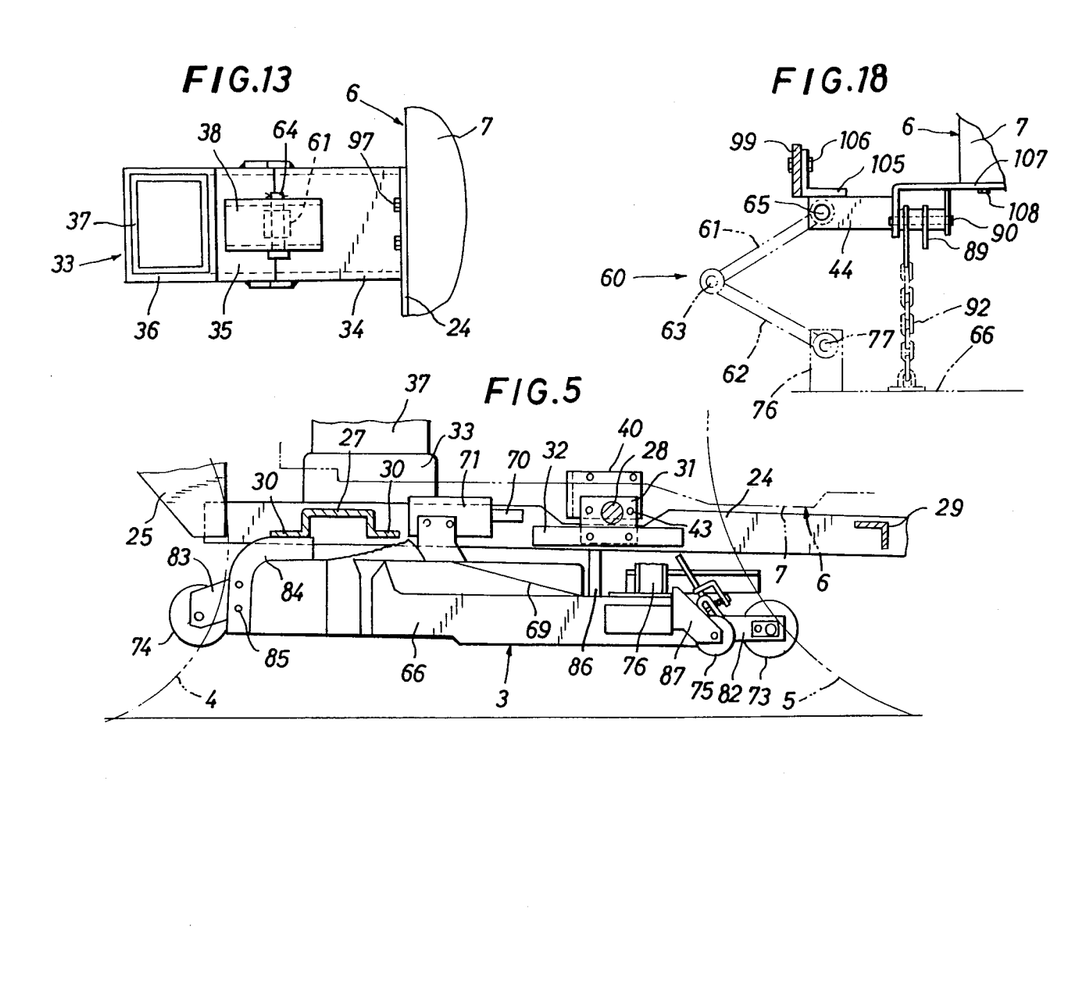
FIG. 5 is a fragmentary side elevation partly in section and showing the same embodiment as in FIG. 4 in a different state.
FIG. 13 is a plan view of the same.
FIGS. 17 and 18 are views in section taken along the lines D—D and E—E in FIG. 15, respectively.
Figure 6:
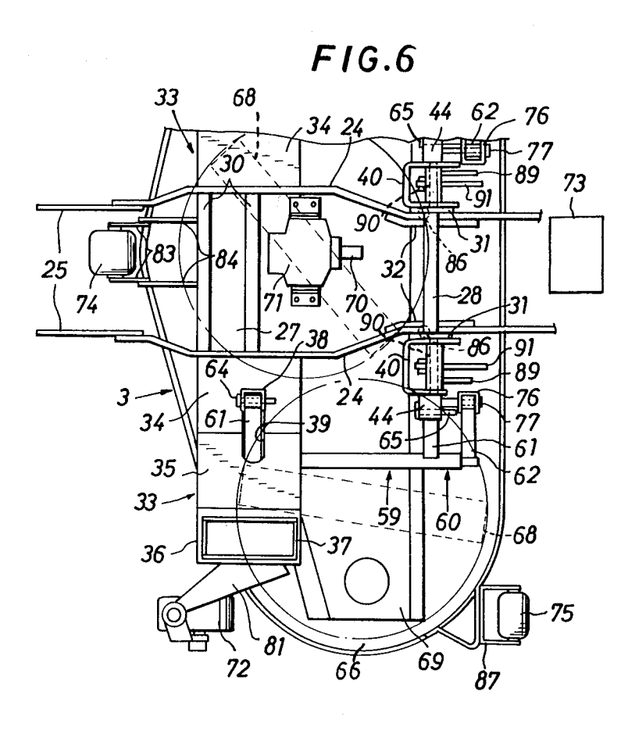
FIG. 6 is a plan view of the same.

As seen in FIG. 5, the reinforcing members 84 prevent rise of the mower 3 by coming into contact with the front lip 30 of the front connecting member 27. The bracket plates 83 are fixed to the deck reinforcing members 84 by bolts 85.

The mower deck 66 is provided, also at opposite side rear portions thereof, with rear stoppers 86 which are each in the form, for example, of a round rod. The mower 3 is prevented from rising by the rear stoppers 86 coming into contact with the mount members 24 as shown in FIG. 5.

The rear limit gauge wheels 75 are connected to rear opposite side portions of the deck 66, each by a bracket 87.

The pin 18 for each lower link 17 is removably provided with a pivotable member 88, which is in engagement with the lower link 17. The pivotable member 88 is movable with the lower link 17 only when the link is raised.

Each bracket frame 40 rotatably supports a coupling member 89 by a pivot 90 extending longitudinally of the tractor. The coupling member 89 is coupled to the corresponding pivotable member 88 by a rod 91 and is also connected to the mower deck 66 by a chain 92.

According to the embodiment described above, one or both of the front loader 2 and the mower 3 can be readily mounted on the tractor body 6.

Because the mount members 24 to which the loader 2 and the mower 3 are attached extend longitudinally of the tractor body 6 at opposite sides thereof and are connected at their front ends to the front portion of the body 6 and at their rear ends to the rear portion of the body 6, the weight acting on the loader 2 and the mower 3 and the load acting thereon can be satisfactorily supported by the whole assembly of the tractor body 6 and the opposed mount members 24.

The projecting brackets 33, which are arranged toward the front from the steps 10 for the driver to ride in or get off from the tractor 1, will not become an obstacle to the driver 1 when he ascends to or descends from the tractor 1. When desired, the brackets 33 are usable as auxiliary steps by the driver.

Because each front mount portion 38 is provided upright on the upper surface of the projecting bracket 33, the upper end of the upper link 61 of the flexible link assembly 60 can be attached to the mount portion 38 at a higher level then when the mount portion 38 is provided beneath the bracket 33. The mower 3 is therefore liftable to a higher level above the ground.

To lift the mower 3, the lower links 17 are raised by the lift arms 12 of the hydraulic unit 13 to turn the pivotable members 88. This rotates the coupling members 89 through the rods 91, causing the chains 92 to lift the mower 3 while flexing the flexible link assemblies 60 of the lift link mechanism 59.

Conversely, when the lower links 17 are lowered, the mower 3 descends under gravity while stretching the flexible link assemblies 60.

To use the mower 3 for cutting grass, the cutting height adjusting gauge wheels 72, 73 are brought into contact with the ground, with the chains 92 loosened, and the rotary cutters 68 are driven while running the mower 3. The mower 3 then smoothly follows the ground while flexing or stretching the link assemblies 60 for mowing operation.

When the mower 3 is lifted by the hydraulic unit 13 or is jolted up by undulations of the ground, the contact of the deck reinforcing members 84 with the front connecting member 27 and of the rear stoppers 86 with the mount members 24 restrains the rise of the mower 3. This eliminates the likelihood that the cover 69 and other members will be brought into contact with the mount members 24, etc. and thereby deformed.

FIGS. 8 to 11 show a second embodiment of the present invention. The power take-off unit 78 is pivotably provided between front portions of the side plates 22 of the front axle frame 9. The unit 78 is movable between a downwardly projecting position which is shown in solid lines in FIG. 8 and in which it projects downward from the side plates 22 with the power take-off shaft 79 directed rearward and a horizontal stowed position which is indicated in phantom lines in FIG. 8 and in which it is horizontally stowed between the side plates 22 with the power take-off shaft 79 directed downward.

The mount members 24 are removably attached at their longitudinally intermediate portions to the transmission case 7 by bracket frames 40 and at their rear ends to the rear axle cases 11 by brackets 26.

Figures 9, 12:
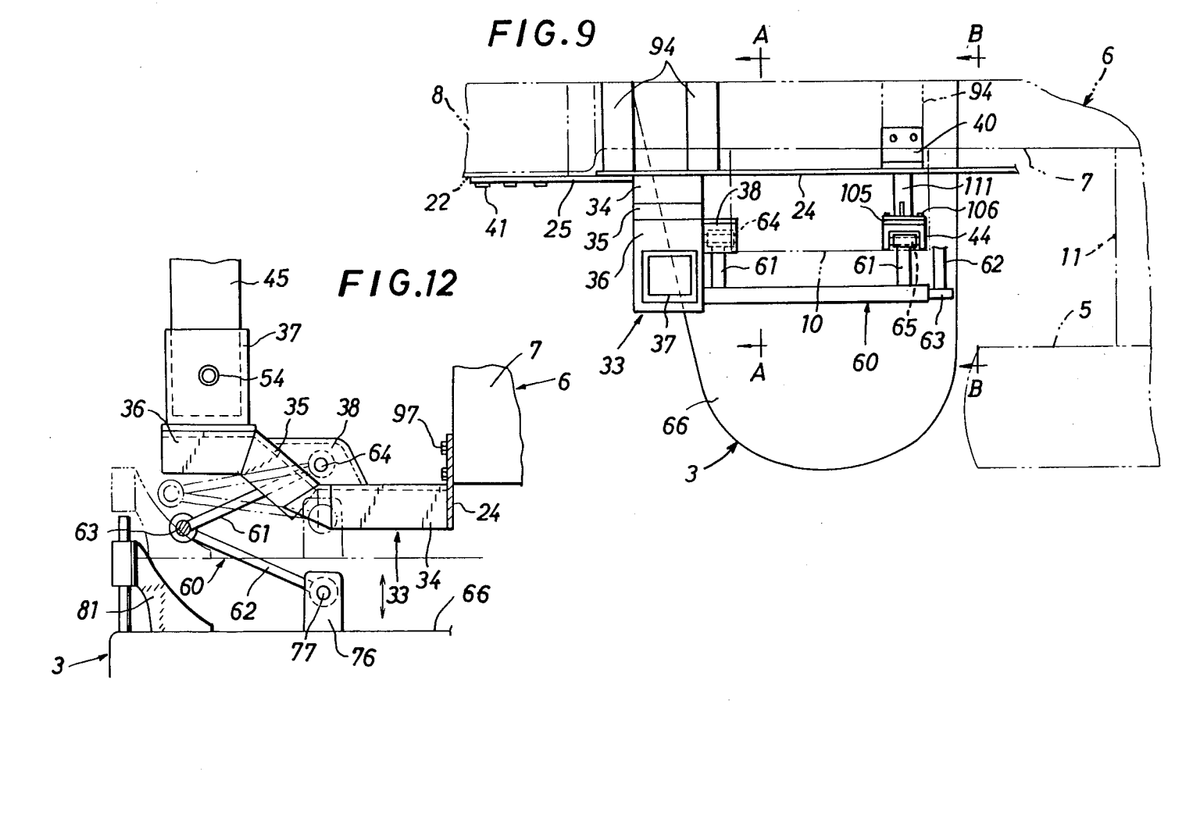
FIG. 9 is a fragmentary plan view.
FIG. 12 is a fragmentary rear view partly in section.

As indicated in solid lines in FIGS. 9 and 10, the mount members 24 may be interconnected at their front ends by a pair of front and rear connecting members 94. The opposed bracket frames 40 may be interconnected by a connecting member 94 as indicated in phantom lines in FIGS. 9 and 10.

Figures 11, 14:
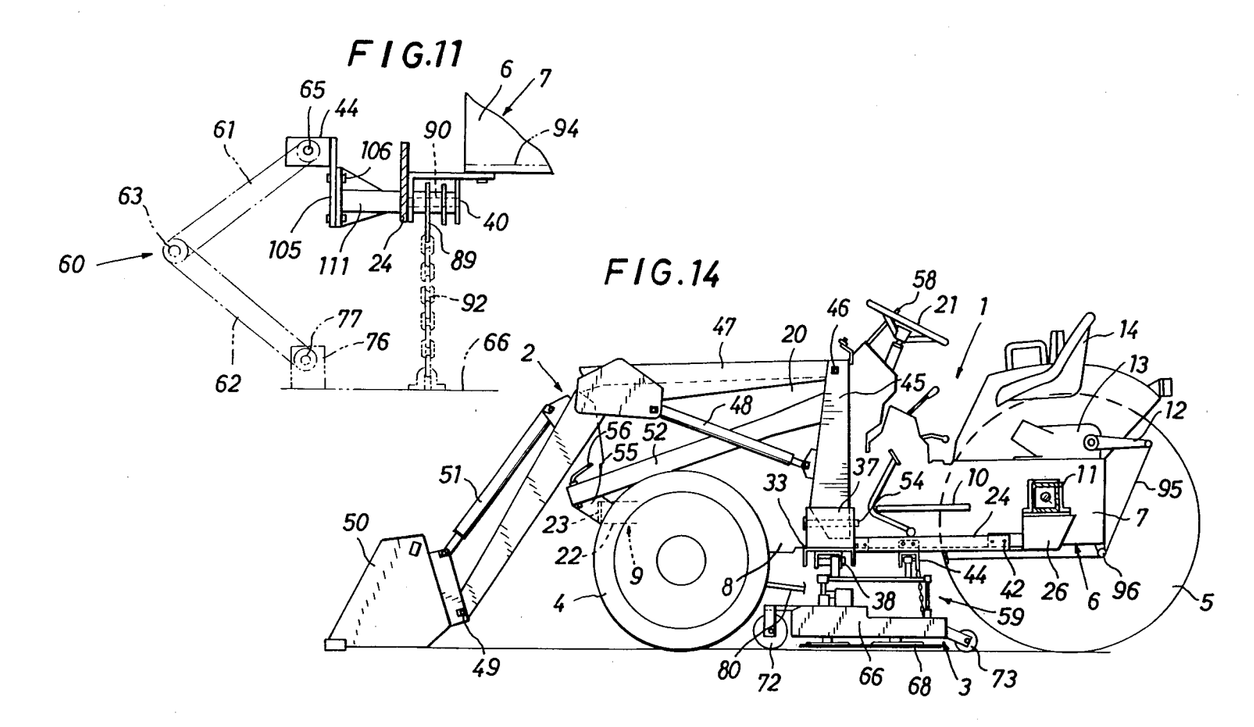
FIG. 14 is an overall side elevation.
Figure 15:
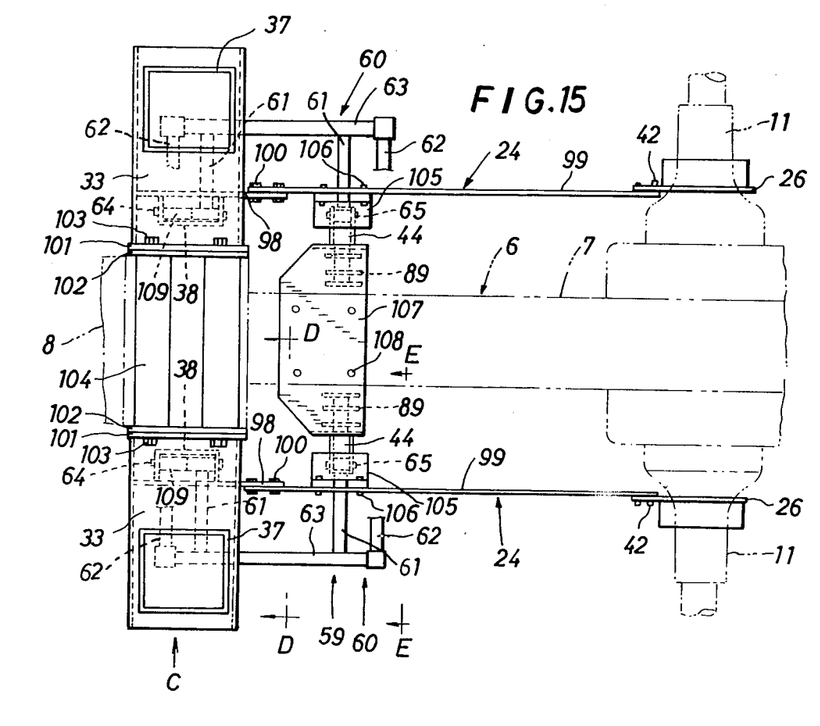
FIG. 15 is a fragmentary plan view.

Each mower front mount portion 38 is provided in a rearwardly projecting form on the rear side of the horizontal outer portion 36 of the projecting bracket 33.

A mount rod 111 extends laterally outward from the portion of each mount member 24 where the bracket frame 40 is attached to the member 24, and the mower rear mount portion 44 is removably connected to the outer end of the mount rod 111 by a connecting member 105 and bolts 106.

Figure 8:
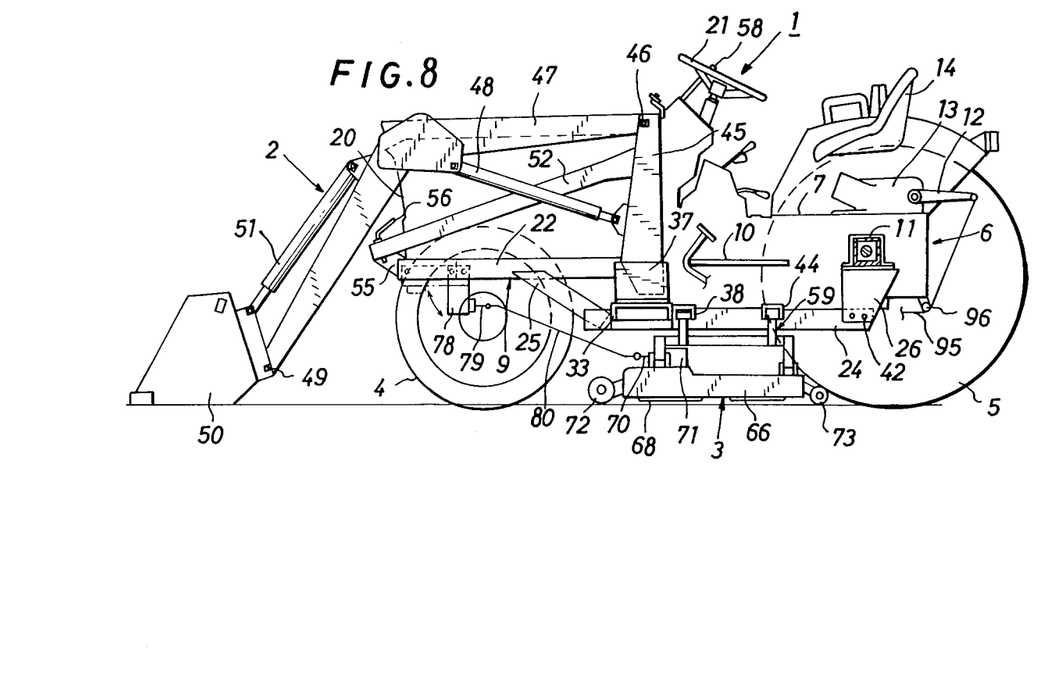
FIG. 8 is an overall side elevation.

A lift wire 95 extending over a guide wheel 96 connects each lift arm 12 to the coupling member 89.

According to the second embodiment, the mower front mount portion 38 is provided in the form of a rearward projection on the rear side of each projecting bracket 33, so that the front upper link 61 of the flexible link assembly 60 can be removably attached to the front mount portion 38 with ease. Whereas the first embodiment has the opening 39 in each projecting bracket 33 for inserting the front upper link 61 therethrough, the above arrangement eliminates the necessity of forming such an opening and inserting the front upper link 61 through the opening to connect the link to the mount portion.

FIGS. 12 and 13 show a third embodiment of the present invention, wherein the front end of each mount member 24 is attached directly to a front portion of the tractor body 6, e.g. to a front portion of the transmission case 7, by bolts 97.

The laterally middle portion of the top wall of each projecting bracket 33 at the outward part of its horizontal inner portion 34 and the slanting portion 35 is upwardly recessed to provide the mower front mount portion 38. The upper end of the front upper link 61 of the flexible link assembly 60 is disposed within the mount portion 38 and pivoted thereto by a pin 64.

The mower front mount portion 38 thus provided by upwardly recessing part of the top wall of the projecting bracket 33 functions as a reinforcing rib, giving improved strength to the bracket 33.

FIGS. 14 to 18 show a fourth embodiment of the present invention, in which each mount member 24 consists of a front segment 98 and a rear segment 99. The opposed ends of the segments 98 and 99 are separably connected together by bolts 100.

Each projecting bracket 33 is horizontal transversely of the tractor body. The front segment 98 is attached to an inward portion of the bracket 33.

The bracket 33 has at its inner end an attaching plate 101, which is removably attached by bolts 103 to a front portion of the transmission case 7, with an intermediate plate 102 interposed therebetween.

The mower front mount portion 38 is secured to the lower surface of the inner portion of the bracket 33 and/or the inner surface of the front segment 98.

The opposed intermediate plates 102 are interconnected by a connecting member 104, which is removably attached to the bottom of the transmission case 7.

A bracket member 105 in the form of an angle member is removably attached to the inner surface of a front portion of the rear segment 99 by bolts 106. The outer portion of the mower rear mount portion 44 is secured to the bottom of the bracket member 105. The outer end of a bracket 107 is secured to the inner end of the rear mount portion 44.

The bracket 107, which is removably fixed to the bottom of the transmission case 7 by bolts 108, serves to connect the rear segment 99 to the tractor body 6 and to connect each rear segment 99 to the other rear segment 99.

The coupling member 89 is rotatably supported by a pivot 90 at each end of the bracket 107.

To render large and small two kinds of mowers 3 attachable to the mower front and rear mount portions 38, 44, each front mount portion 38 has front and rear two positions for attaching the mower 3 thereto.

When the small mower 3 is to be attached, the distance between the front and rear upper links 61 of the flexible link assembly 60 is smaller. As seen in solid lines in FIG. 16, therefore, the upper end of the front upper link 61 is pivotally supported by the rear portion of a pin 64 within the front mount portion 38, and a collar 109 for restraining the front upper link 61 from moving axially of the pin 64 is removably fitted around the front portion of the pin 64.

Alternatively when the large mower 3 is to be mounted, the distance between the front and rear upper links 61 of the flexible link assembly 60 is larger. As shown in phantom lines in FIG. 16, the upper end of the front upper link 61 is then pivotally supported by the front portion of the pin 64 within the front mount portion 38, with the collar provided on the rear portion of the pin 64.

Figure 16:
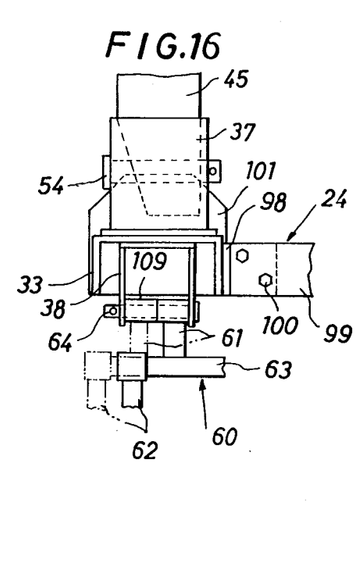
FIG. 16 shows the arrangement illustrated in FIG. 15 as it is seen in the direction of arrow C.
Figure 17:
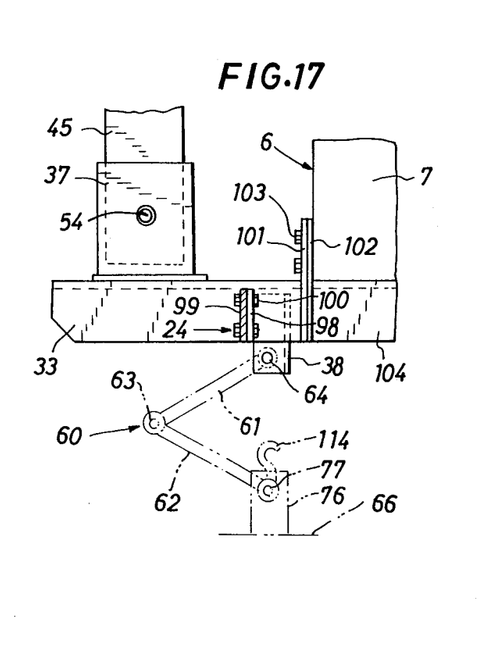

If the collar 109 is divided into a plurality of rings, the upper end of the front upper link 61 can be supported also at an axially intermediate portion of the pin 64. Thus, the mower 3 can be attached to the front mount portions 38 at three or more positions which are different longitudinally of the tractor body 6.

Furthermore, the front mount portion 38 may have a plurality of mower attaching positions transversely of the tractor body.

Furthermore, each mower rear mount portion 44 may have a plurality of mower attaching positions, or each front mount portion 38 and each rear mount portion 44 may have a plurality of mower attaching positions.

Pivotable hooks 114 which are engageable with ends of the pins 64, 65 when the mower 3 is lifted are provided, for example, at the lower ends of the front and rear lower links 62 of each flexible link assembly 60. When the tractor 1 is to be driven on the road, the hooks 114 are engaged with the pins 64, 65 to prevent the mower 3 from swinging.

Figures 7, 21:
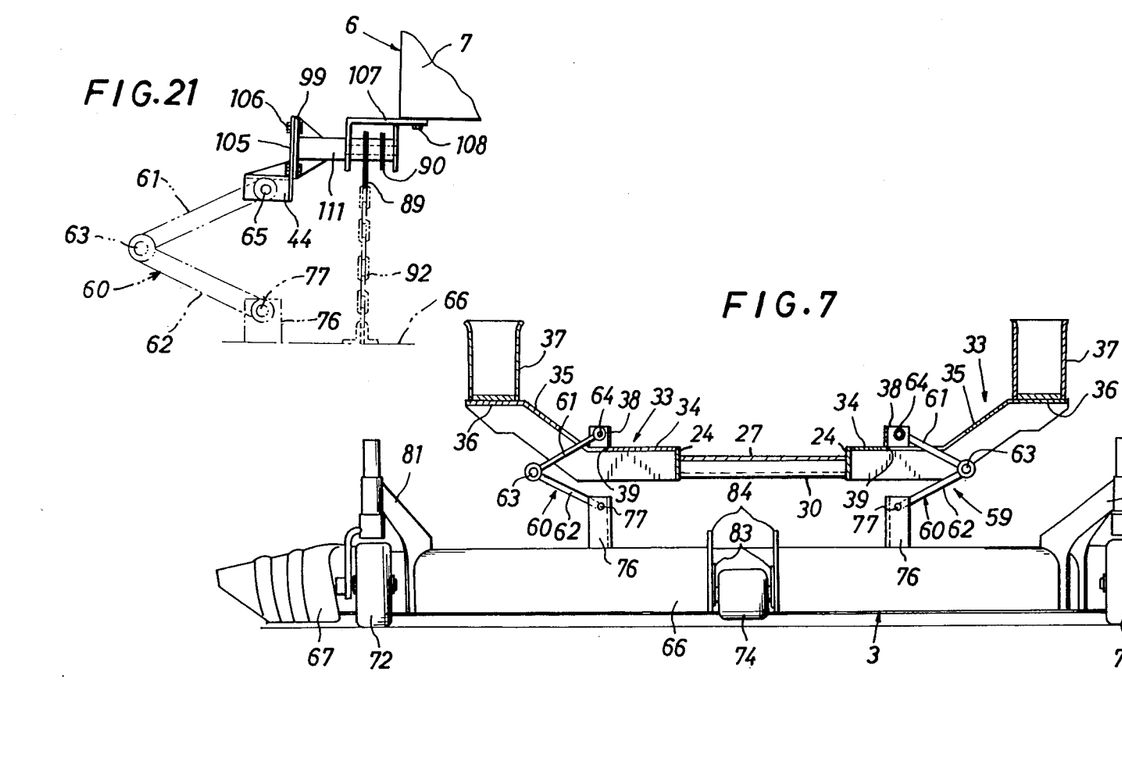
FIG. 7 is a front view partly in section and showing the same embodiment.
FIG. 21 is a view in section taken along the line F—F in FIG. 20.
Figure 19:
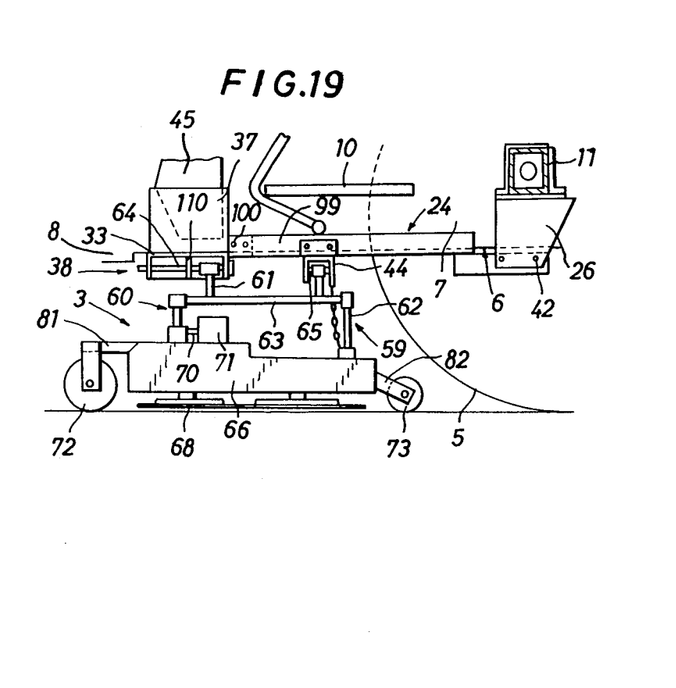
FIG. 19 is a fragmentary side elevation.
Figure 20:
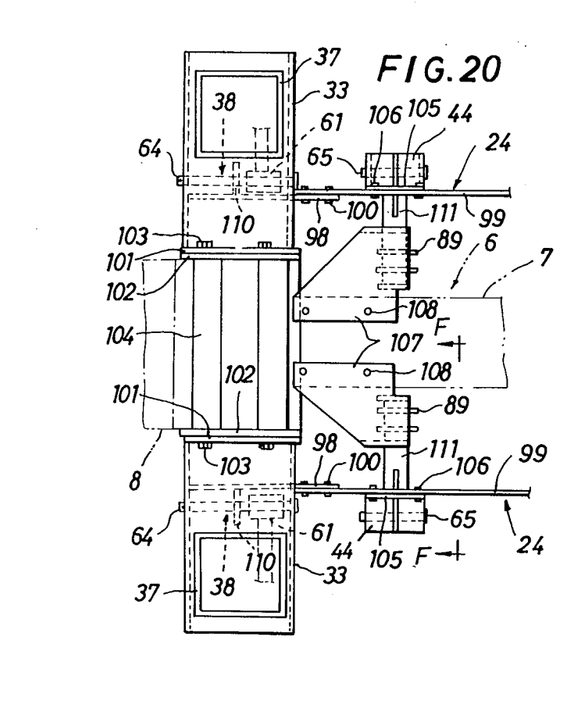
FIG. 20 is a plan view of the same.

FIGS. 19 to 21 show a fifth embodiment of the present invention, in which the mower front mount portion 38 has the following construction.

A partition 110 opposed to the front and rear walls of the projecting bracket 33 is secured to the outer surface of the front segment 98 at the longitudinal midportion thereof and/or the lower surface of the top wall of the bracket 33. A pin 64 is removably inserted through the partition 110 and the front and rear walls of the projecting bracket 33.

The upper end of the front upper link 61 is pivotally supportable by the front and rear portions of the pin 64 on opposite sides of the partition 110. Thus, the collar 109 of the fourth embodiment is omitted.

The bracket 107 of this embodiment comprises a pair of opposed segments. A mount rod 111 extends laterally outward from the outer portion of each bracket segment, and the rear segment 99 is secured to the outer end of the mount rod 111.

By a bracket member 105 and bolts 106, the mower rear mount portion 44 is removably fixed to the outer surface of the rear segment 99 at the portion thereof where the mount rod 111 is secured.

Although mowers are used as mid-mount type working implements in the foregoing embodiments, the working implements may be other grass or weed removing devices, cultivators, etc.

What is claimed is:

1. A device for mounting working implements on a tractor comprising
   a pair of mount members provided at opposite sides of a tractor body, a step secured to each side of said tractor body,
each of said mount members extending longitudinally of said tractor body and being attached at its front end to a front portion of said tractor body and at its rear end to a rear portion of said tractor body,
a projecting bracket provided at the front end of each of said mount members and extending laterally outwardly therefrom,
each said bracket being positioned in front of said steps,
a mount for a front loader provided on an outer portion of each said projecting bracket,
a fore mount for a mid-mount type working implement provided on each said bracket inwardly of said front loader mount,
said pair of opposite mount members being connected by a first connecting member extending under the tractor body and located between said projecting brackets,
a hind mount for the mid-mount type working implement provided intermediately of each of said mount members,
a mid-mount type working implement mounted on said fore and hind mounts by means including two pairs of lift link mechanisms, each said lift link mechanisms comprises a pair of opposed flexible link assemblies forming an angular shape to provide vertical flexibility,
a first pair of said lift link mechanisms are mounted on said fore mounts by connections at upper ends of said first pair of said lift link mechanisms, and
a second pair of said lift link mechanisms are mounted on said hind mounts by connections at upper ends of said second pair of said lift link mechanisms.

2. A device as defined in claim 1 wherein said pair of mount members are interconnected by second and third connecting members at longitudinally intermediate portions and at the rear ends, respectively.

3. A device as defined in claim 1 wherein each projecting bracket comprises a horizontal inner portion, a slanting intermediate portion extending upwardly outward from the inner portion and a horizontal outer portion.

4. A device as defined in claim 1 wherein each said front loader mount is in the form of a box having an open upper end and provided upright on said outer portion of said projecting bracket, and a front loader is provided which has an attaching member removably fittable in the mount portion.

5. A device as defined in claim 1 wherein each said fore mount is located at a transversely intermediate portion of each projecting bracket.

6. A device as defined in claim 2 wherein hind mounts stoppers are provided on a deck of the mid-mount working implement for limiting rise of the implement by coming into contact with the first connecting member or the mount members.

7. A device as defined in claim 1 wherein longitudinally intermediate portions of the two mount members are attached to a longitudinally intermediate portion of the tractor body, and the hind mounts are provided, each in a laterally outwardly projecting form, approximately at the portions of the mount members attached to the tractor body.

8. A device as defined in claim 1 wherein at least one of each fore mount and each hind mount has a plurality of positions for attaching at least two kinds of mid-mount type working implements to the fore and hind mounts of the device.

9. A device for mounting working implements on a tractor comprising a pair of mount members provided at opposite sides of a tractor body,
a step secured to each side of said tractor body,
each of said mount members extending longitudinally of said tractor body and being attached at its front end to a front portion of said tractor body and at its rear end to a rear portion of said tractor body,
a projecting bracket provided at the front end of each of said mount members and extending outwardly therefrom,
each said bracket being positioned in front of said steps,
a mount for a front loader provided on an outer portion of each said projecting bracket,
a fore mount for a mid-mount type working implement provided on each said bracket inwardly of said front loader mount,
said pair of opposite mount members being connected by a connecting member extending under the tractor body and located between said projecting brackets,
a hind mount for the mid-mount type working implement provided intermediately of each of said mount members, and
said fore mount is provided upright on an inner portion of each said projecting bracket, and said fore and said hind mounts are each in the form of a U-shaped frame, a mid-mount type working implement being attached liftably and removably to said fore and hind mounts by means of a lift link mechanism, each projecting bracket being formed at a laterally intermediate portion thereof with an opening for inserting a link of the lift link mechanism therethrough.

10. A device for mounting working implements on a tractor comprising a pair of mount members provided at opposite sides of a tractor body,
a step secured to each side of said tractor body,
each of said mount members extending longitudinally of said tractor body and being attached at its front end to a front portion of said tractor body and at its rear end to a rear portion of said tractor body,
a projecting bracket provided at the front end of each of said mount members and extending outwardly therefrom,
each said bracket being positioned in front of said steps,
a mount for a front loader provided on an outer portion of each said projecting bracket,
a fore mount for a mid-mount type working implement provided on each said bracket inwardly of said front loader mount,
said pair of opposite mount members being connected by a connecting member extending under the tractor body and located between said projecting brackets, and
a hind mount for the mid-mount type working implement provided intermediately of each of said mount members, and
each projecting bracket is in the form of a channel member which is open downward, and a top wall of the projecting bracket has an opening at a laterally intermediate portion thereof adjacent the fore mount which is provided upright on the top wall, a mid-mount type working implement being attached liftably to the fore and hind mounts by a lift link mechanism, the lift link mechanisms having links pivotally supported within the fore mounts and extending through the openings for attachment to the implement.

* * * * *